United States Patent [19]

Soumenis

[11] Patent Number: 4,750,824

[45] Date of Patent: Jun. 14, 1988

[54] PROTECTED REARVIEW MIRROR ASSEMBLY

[76] Inventor: John Soumenis, 85-98 150th St., Jamaica, N.Y. 11435

[21] Appl. No.: 57,638

[22] Filed: Jun. 4, 1987

Related U.S. Application Data

[63] Continuation of Ser. No. 823,289, Jan. 28, 1986, abandoned.

[30] Foreign Application Priority Data

Feb. 14, 1985 [GR] Greece .................................. 850391
Oct. 7, 1985 [GR] Greece .................................. 852416

[51] Int. Cl.$^4$ .......................... G02B 7/18; B65D 85/38
[52] U.S. Cl. ...................................... 350/582; 350/606
[58] Field of Search ................ 350/582, 588, 604–606; 248/200

[56] References Cited

U.S. PATENT DOCUMENTS

| | | | |
|---|---|---|---|
| 1,029,228 | 6/1912 | Royle .................................. | 248/200 |
| 1,891,966 | 12/1932 | Withrow ............................. | 350/606 |
| 2,649,839 | 8/1953 | Condon .............................. | 350/582 |
| 2,691,920 | 10/1954 | Curcuru ............................. | 350/582 |
| 2,883,134 | 4/1959 | O'Halloran ........................ | 248/210 |
| 4,322,132 | 3/1982 | Derr .................................. | 350/606 |

FOREIGN PATENT DOCUMENTS

| | | | |
|---|---|---|---|
| 2254338 | 11/1972 | Fed. Rep. of Germany ...... | 350/606 |
| 2745316 | 4/1979 | Fed. Rep. of Germany ...... | 350/606 |
| 1250976 | 12/1960 | France ............................... | 350/606 |
| 44078 | 3/1980 | Japan ................................. | 350/582 |

*Primary Examiner*—William H. Punter
*Attorney, Agent, or Firm*—Perry Carvellas

[57] ABSTRACT

A mirror is position-adjustably mounted to an upstanding part from which a protective hood rearwardly extends. A hanging device is provided to hang the hood from the top edge of the side window of a vehicle so as to protect the mirror and the adjacent window from rain. The hood preferably has a semicircular cross-sectional configuration and the position thereof relative to the window may be adjusted. In an alternate embodiment, the hood may be affixed directly to the vehicle door by a position-adjustable bracket.

13 Claims, 5 Drawing Sheets

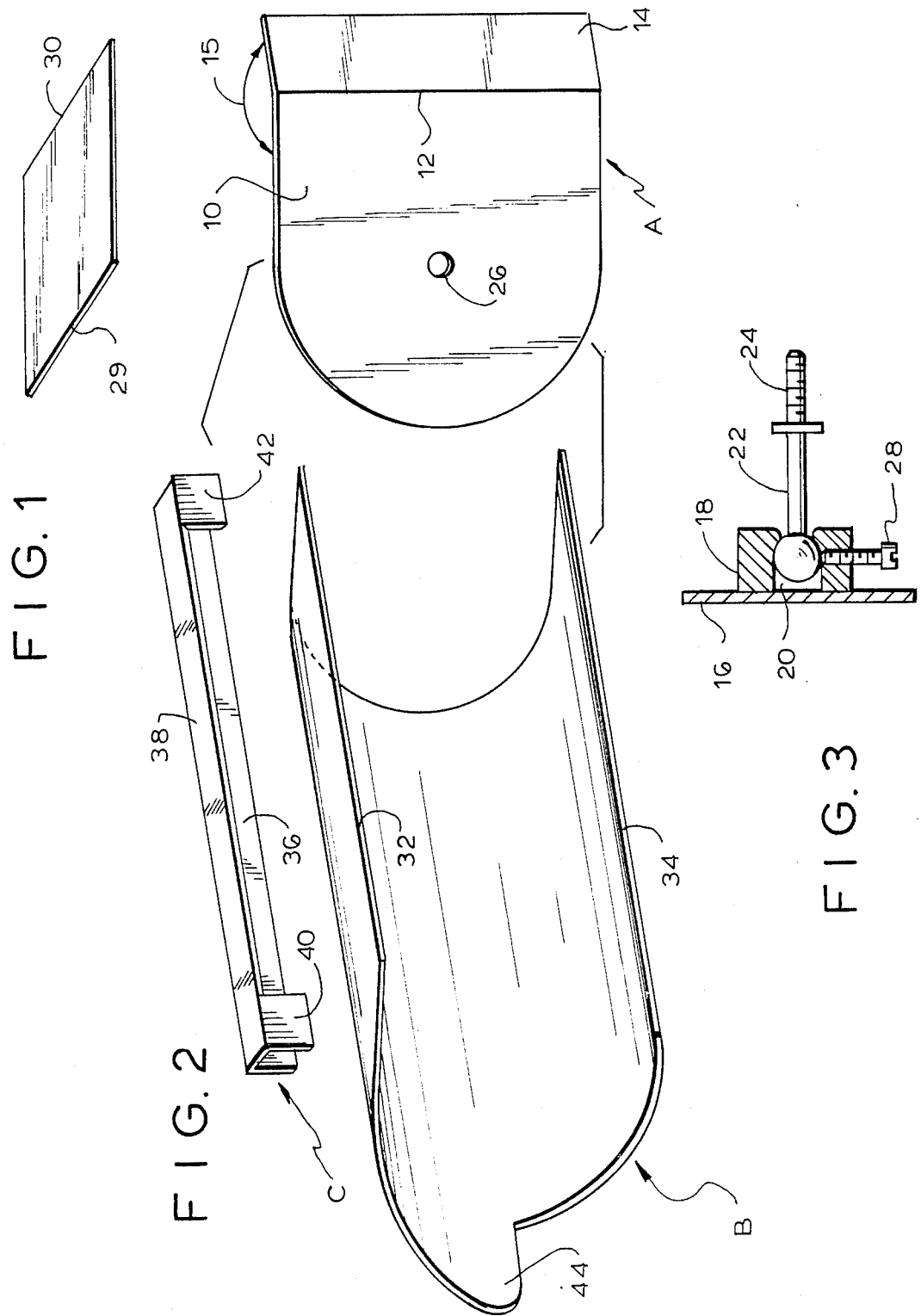

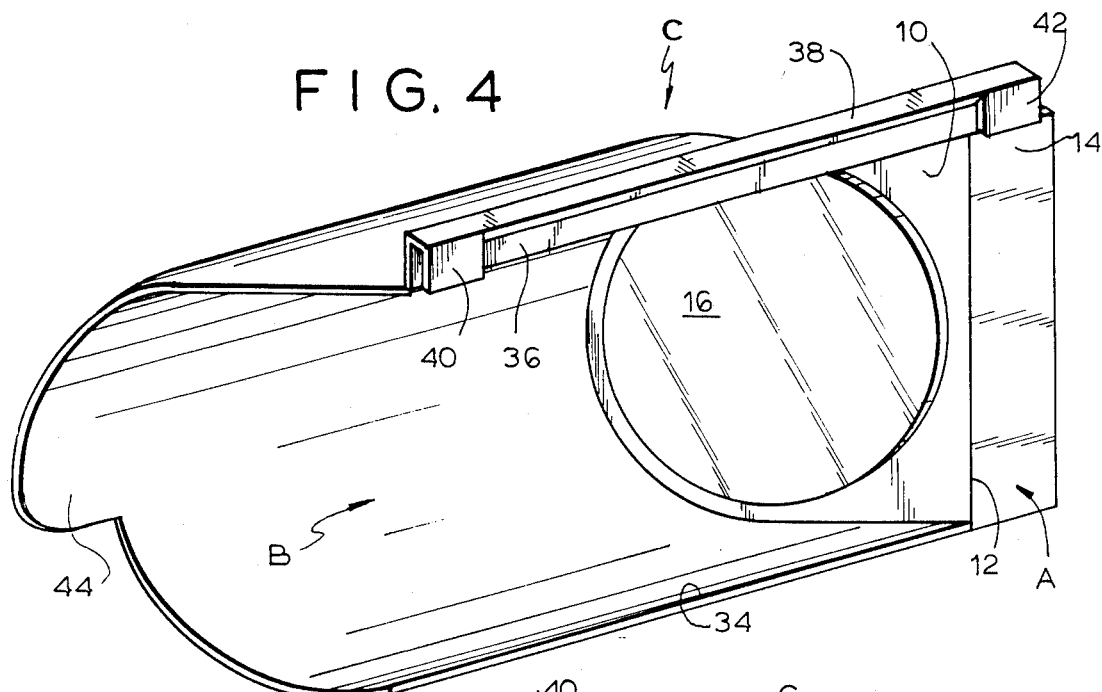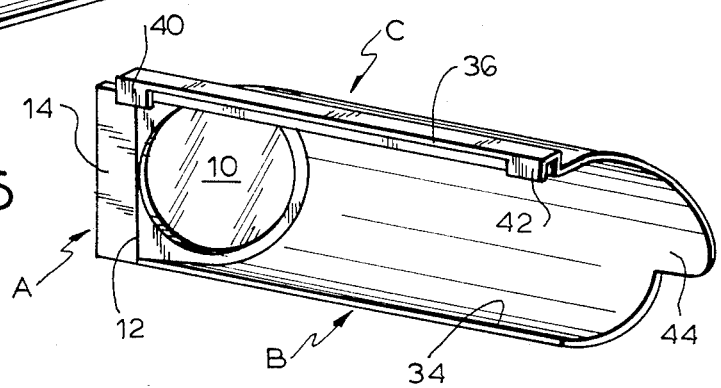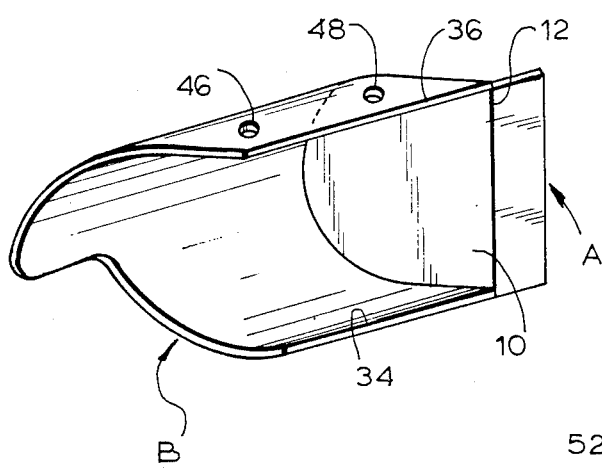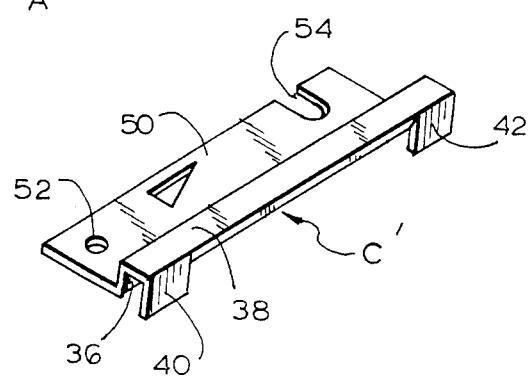

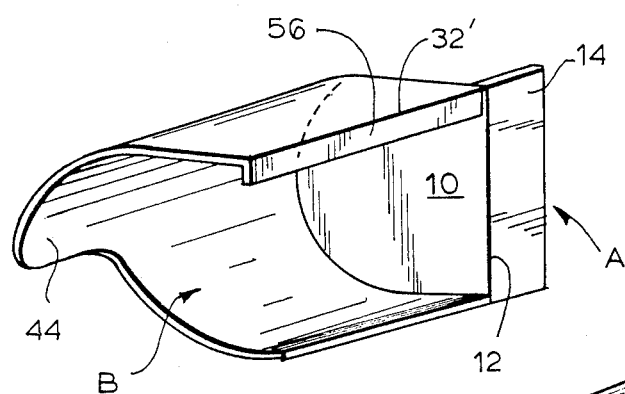
FIG. 8
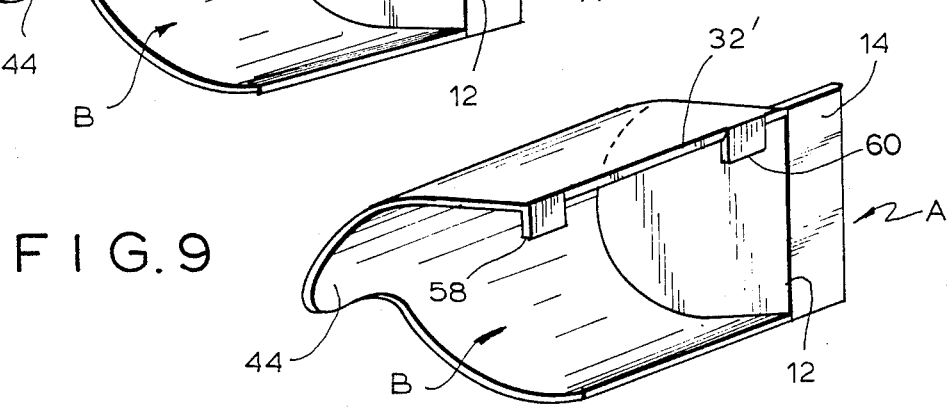
FIG. 9
FIG. 11
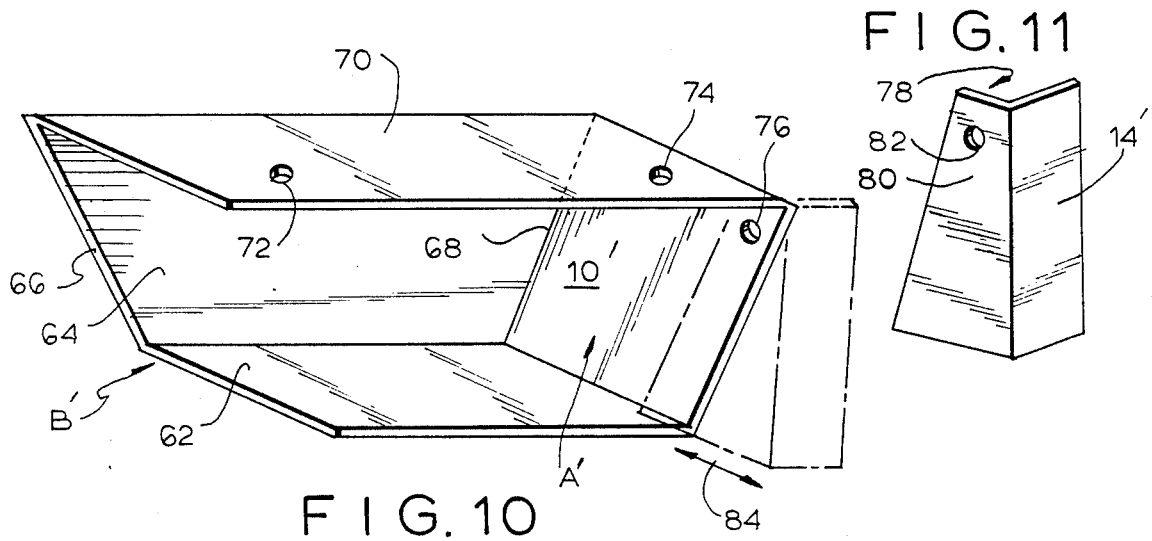
FIG. 10
FIG. 13
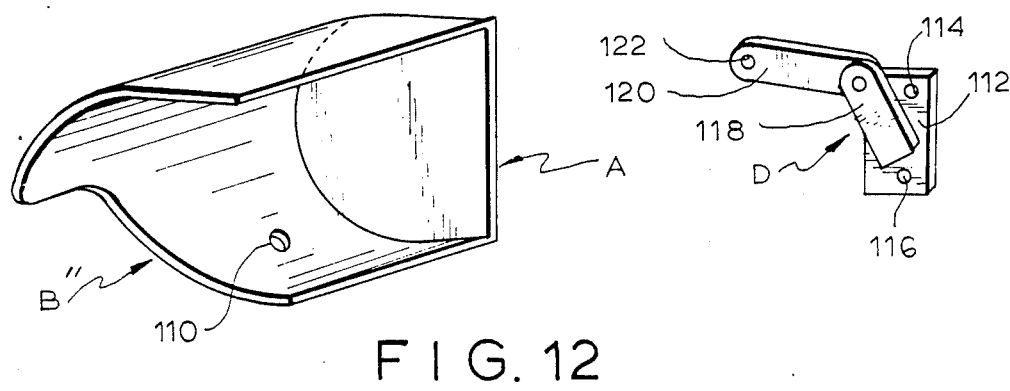
FIG. 12

PROTECTED REARVIEW MIRROR ASSEMBLY

This application is a continuation of application Ser. No. 823,289, filed Jan. 28, 1986, & now abandoned.

FIELD OF THE INVENTION

The present invention relates to rear view mirrors for vehicles and the like and, more particularly, to a rearview mirror assembly for use on a vehicle which includes a hood to protect the mirror and the adjacent window from rain.

BACKGROUND OF THE INVENTION

Various types of vehicles, such as automobiles, trucks, boats, and the like, utilize rearview mirrors mounted externally, usually on the driver's door and sometimes on the passenger's door as well. In order to use the mirror, the driver must look through the side window adjacent the mirror. However, in adverse weather conditions, such as rain or snow, the driver's view through the externally mounted rearview mirror may be obstructed, either because of moisture on the mirror itself, or on the window adjacent the mirror through which the driver must look.

OBJECTS OF THE INVENTION

It is, therefore, a prime object of the present invention to provide a protected rearview mirror assembly for external use on vehicles which protects the mirror and the adjacent window section from rain and snow.

It is another object of the present invention to provide a protected rearview mirror assembly for external use on a vehicle or the like which is designed to be mounted on the side window of the vehicle or to the vehicle door.

It is another object of the present invention to provide a protected rearview mirror assembly which can be inexpensively mass produced using conventional manufacturing techniques.

BRIEF DESCRIPTION OF THE INVENTION

In accordance with one aspect of the present invention, a rearview mirror assembly is provided for use on a vehicle or the like of the type having a side window with a top edge. The assembly comprises a mirror, mirror mounting means, hood means, and means for hanging the hood means on the top edge of the window. The hood means is mounted to and extends from the mirror mounting means towards the rear of the vehicle for a distance at least equal to the vertical dimension of the mirror. The hanging means defines a recess into which the top edge of the window is adapted to be received.

The mirror mounting means comprises first and second parts. The first part has a substantially semicircular section. The second part is substantially planar. The first part and the second part are joined to form an angle of at least 90° therebetween. A bracket is provided for mounting the mirror to the first part.

The hood means preferably has a substantially semicircular cross-sectional shape. Alternatively, the hood means may have a substantially rectangular cross-sectional shape.

The hood means has a top edge and a bottom edge. The top edge is preferably longer than the bottom edge.

The hanger means comprises a first substantially upstanding wall and a second substantially upstanding wall connected to said first wall. The second upstanding wall is spaced from the first wall by a distance at least as great as the thickness of the window. Means are provided for mounting the first wall to the hood means.

The means for mounting the first wall to the hood means comprises means for position-adjustably mounting the first wall to the hood means. The position-adjustable mounting means comprises means for pivotally mounting the first wall to the hood means and means for locking the first wall in a given position relative to the hood means.

The hood means has a top edge. The hanger means comprises a wall extending downwardly from the hood means top edge.

Means are provided for positioning the hood means relative to the window. The hood means positioning means comprises a bracket having first and second generally perpendicular walls. One of the walls is position-adjustably mounted to the mirror mounted means.

In accordance with another aspect of the present invention, a rearview mirror assembly is provided for use on a vehicle having a door. The assembly comprises a mirror, mirror mounting means, hood means, and means for adjustably mounting the mirror mounting means to the vehicle door. The hood means is mounted to and extends from the mirror mounting means towards the rear of the vehicle for a distance at least equal to the vertical dimension of the mirror.

The mirror mounting means comprises first and second parts. The first part has a substantially semicircular section. The second part is substantially planar. The first part and the second part are joined to form an angle of at least 90° therebetween. A bracket is provided for mounting the mirror to the first part.

The hood means has a substantially semicircular cross-sectional shape. Alternatively, the hood means may have a substantially rectangular cross-sectional shape.

The hood means has a top edge and a bottom edge. The top edge is preferably longer than the bottom edge.

To these and to such other objects which may hereinafter appear, the present invention relates to a protected rearview mirror assembly, as set forth in detail in the following specification and recited in the annexed claims, taken together with the accompanying drawings, wherein like numerals refer to like parts, and in which:

BRIEF DESCRIPTION OF FIGURES OF THE DRAWINGS

FIG. 1 is a perspective view of a sheet of material from which the hood member of the present invention will be formed;

FIG. 2 is an exploded isometric view of the mirror assembly of the present invention;

FIG. 3 is a side cut-away view showing the mirror and mirror mounting bracket of the present invention;

FIG. 4 is a perspective view of the protected rearview mirror assembly of the present invention for use on the driver's side of the vehicle;

FIG. 5 is a perspective view of the protected rearview mirror assembly of the present invention for use on the passenger's side of a vehicle;

FIG. 6 is a perspective view of a second preferred embodiment of the present invention;

FIG. 7 is a perspective view of an adjustable mounting bracket designed for use with the embodiment of the present invention as shown in FIG. 6;

FIG. 8 shows an alternate embodiment of the hood mounting means of the present invention;

FIG. 9 shows another alternate embodiment of the hood mounting means of the present invention;

FIG. 10 is a perspective view of an alternate embodiment of the present invention, having a rectangular-shaped hood;

FIG. 11 is a perspective view of an adjustable position mounting bracket for use with the embodiment illustrated in FIG. 10;

FIG. 12 is a perspective view of an alternate embodiment of the present invention for mounting on a vehicle door;

FIG. 13 is a perspective view of a bracket for mounting the assembly illustrated in FIG. 12 to a vehicle door;

DETAILED DESCRIPTION OF THE INVENTION

Figure 15:
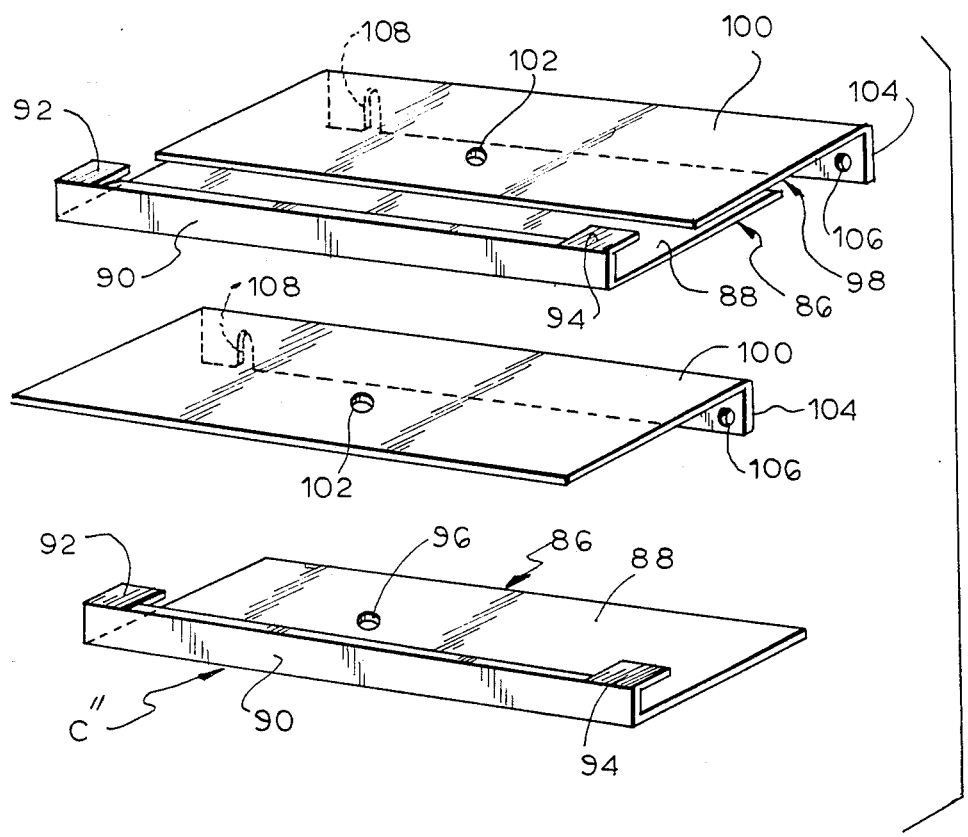
FIG. 15 illustrates a two-part hanger means for use with the assembly of the present invention.

The present invention is a protected rearview mirror assembly which, as illustrated in FIG. 2, comprises a mirror mounting member, generally designated A, a hood member, generally designated B, and a hanger member, generally designated C, in its first embodiment form. The mirror mounting member A includes a first wall 10 having a generally semicircular shape with a straight edge 12. Joined to edge 12 is a second planar generally rectangular wall 14. Wall 14 is joined to wall 10 along edge 12 such that an obtuse angle 15 is formed therebetween. A mirror 16, preferably of circular configuration, is mounted to wall 10 of mirror mounting member A by means of an adjustable bracket, shown in FIG. 3.

The mirror mounting bracket includes a generally cylindrical member 18 having a central opening 20 into which the enlarged circular end of a pin 22 is pivotally mounted. Pin 22 has external screw threads 24 on one end thereof. Wall 10 of mirror mounting member A is provided with an opening 26 into which screw threads 24 on pin 22 are received. Mirror 16 is glued or otherwise affixed to member 18 such that it can be rotated through a limited angle with respect to wall 10. A set screw 28 is provided for tightening the mirror in the appropriate position.

Mounted on and extending from the semicircular periphery of wall 10 of mirror mounting member A is hood member B. In this embodiment, hood member B has a substantially semicircular cross-sectional configuration. Preferably, hood member B has a length (taken along its axis) of approximately 18 centimeters and a diameter of approximately 10 centimeters. It can be formed by cutting a cylindrical pipe in half to provide driver side and passenger side hood members. The pipe can be obtained from a sheet of material, such as plastic or metal, having slanted opposite sides 29, 30, as illustrated in FIG. 1.

For adequate protection of the mirror 16 and the adjacent window from rain and snow, the length of hood B should be at least as long as the vertical dimension of mirror 16 and, hence, the diameter of mirror 16 when mirror 16 is circular. However, the length of hood B may be longer than the diameter of the mirror and is preferably between one and two times the diameter of the mirror and, in some instances even longer. Hood B has a top edge 32 and a bottom edge 34. Preferably, top edge 32 is longer than bottom edge 34 by approximately 5 centimeters. Thus, the top of the hood is longer than the bottom of the hood. This is because the bottom of the hood need protect the mirror and the window only from water which is splashed from the tires of passing vehicles, whereas the top of the hood must protect the mirror and adjacent window from rain as it falls.

The hood mounting member C may take a variety of different forms. In one form, as illustrated in FIG. 2, member C, which is also preferably approximately 18 centimeters in length, has a rear planar wall 36, a top wall 38, and a pair of downwardly extending spaced tabs 40 and 42 forming a front wall. Rear wall 36 is designed to be integral with or joined to edge 32 of hood B in an upstanding fashion. Top wall 38 extends in a generally perpendicular direction from rear wall 36. Tabs 40 and 42 downwardly extend from the edge of top wall 38 and are spaced from the interior surface of rear wall 36 by a distance at least equal to the thickness of the window and defines a recess into which the top edge of the window is adapted to be received.

As should now be readily apparent, when the invention is assembled, as shown in FIG. 4 (which shows a driver's side version) and FIG. 5 (which shows a passenger's side version), the assembly can be hung on the side window of the vehicle by receiving the top edge of the side window between wall 36 and the wall formed by tabs 40 and 42 with wall 14 of mirror mounting member A adjacent the outer window surface. The rearmost portion of hood member B can be provided with a curved ear portion 44 for extra protection of the outer window surface adjacent the mirror.

FIGS. 6 and 7 illustrates a slightly modified version of the present invention. FIG. 6 shows mounting member A and hood member B, the latter of which is provided with a pair of circular openings 46 and 48 at the top thereof. FIG. 7 shows a position-adjustable hanger member C′ for use with the hood B of FIG. 6. Member C′ is provided with a horizontal wall 50 which extends or project from the lower edge of upstanding wall 36 in a direction substantially parallel to the upper surface of hood B. Wall 50 is provided with an aperture 52 and a slot 54, the latter of which extends to the edge thereof. Using a screw and nut (not shown) of conventional design, with the screw passing through aperture 46 on hood member B and aperture 52 on hanger member C′, hanger member C′ can be pivotally mounted to the top of hood member B. Using a second screw and nut combination (not shown) passing through slot 54 on hanger member C′ and aperture 48 in hood member B, the relative position of hood member B with respect to hanger member C′ can be adjusted while the screw is relatively loose and, thereafter, locked into place by tightening the screw.

FIGS. 8 and 9 show alternate hanging methods. In these figures, the top edge 32 of hood member B is extended outwardly beyond the surface of wall 14 of mirror mounting member A by a distance greater than the thickness of the window, forming an edge 32′. In FIG. 8, a downwardly extending wall 56 from edge 32′ is provided defining a recess into which the top edge of the window is adapted to be received. Wall 56 is adapted to be situated adjacent interior surface of the window, along the top edge thereof. Similarly, downwardly extending tabs 58 and 60, illustrated in FIG. 9, form a wall and serve the same purpose.

FIGS. 10 and 11 show an alternate embodiment of the present invention wherein the hood member B' and mirror mounting member A' are substantially rectangular, instead of being semicircular in configuration. Hood B' comprises, along with a rectangular mirror mounting member A' having a rectangular wall 10', a bottom surface 62, a side surface 64 with inclined side edges 66 and 68, and a top surface 70. Top surface 70 has apertures 72 and 74 which correspond to apertures 46 and 48, as shown in FIG. 6, and is designed to be used with a hanger member C', as shown in FIG. 7. Wall 10' is provided with an aperture 76 for pivotal mounting to a member 78, as shown in FIG. 11. Member 78 has a first wall 14' and a second wall 80 which are mounted at an obtuse angle with respect to each other. Wall 80 is provided with an aperture 82 which is fastened to wall 10' by means of a conventional screw and nut (not shown). Wall 14' is adapted to be situated adjacent the surface of the window to which the assembly is mounted such that hood member B' is position-adjustably mounted relative thereto in accordance with the arrow 84 shown in FIG. 10.

FIG. 15 shows an alternate embodiment of hanger member C', denoted generally as C'', which comprises a first part 86 including an upstanding wall 88, a top wall 90, perpendicular thereto, and two downwardly extending tabs 92 and 94. An aperture 96 is provided in wall 88. Part 86 is used in conjunction with part 98 which includes an upstanding wall 100 with an aperture 102 and a bottom wall 104, mounted substantially perpendicular thereto, having an aperture 106 and a slot 108. Aperture 106 and slot 108 perform the same functions as aperture 52 and slot 54 of hanger member C' shown in FIG. 7. Wall 88 is affixed to wall 100 by aligning apertures 96 and 102 and utilizing a screw and nut combination, as illustrated in the assembly portion of the figure.

FIG. 12 shows another embodiment of the hood member B'' for mounting directly to the vehicle door, as opposed to hanging on the window. Preferably, hood member B'' is formed from one-half of a tubular member formed from a rectangular sheet (not shown), instead of the parallelogram sheet shown in FIG. 1, such that the mirror mounting member A is generally perpendicular to the axis of hood B'', as opposed to being somewhat inclined with respect thereto, as in the embodiment shown in FIGS. 2, 4, and 5. Hood member B'' is provided with an aperture 110 designed to be affixed to a bracket, generally designated D, s illustrated in FIG. 13. Bracket D is designed to be affixed directly to the vehicle door. Bracket D consists of a mounting plate 112 having apertures 114 and 116 for affixing to the door. Extending from bracket 112 is a member 118 to which a member 120 is rotatably mounted. Member 120 has an opening 122 thereon which is adapted go be aligned with opening 110 on hood member B'' and affixed thereto by a conventional screw and nut combination (not shown).

Figure 14:
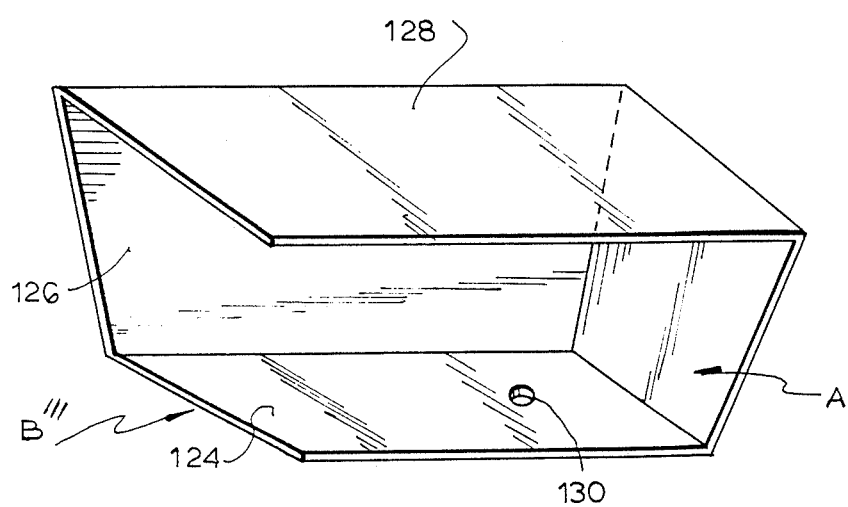
FIG. 14 is a perspective view of a rectangular embodiment of the assembly of the present invention for mounting on a vehicle door.

Alternatively, the hood member may have a generally rectangular configuration, as illustrated in FIG. 14 as hood member B'''. In this case, hood member B''' comprises a mirror mounting member A, a bottom wall 124, a side wall 126, and a top wall 128. Bottom wall 124 is provided with an aperture 130 to permit same to be fastened to bracket D shown in FIG. 13 by means of a screw and nut combination (not shown).

Figure 16:
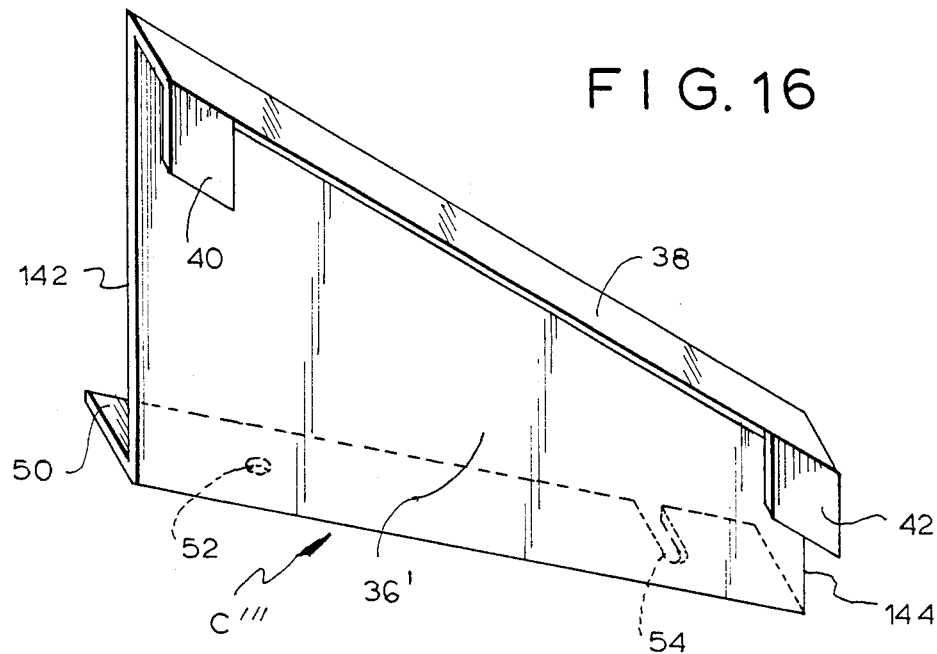
FIG. 16 illustrates another preferred embodiment of the hanger of the present invention designed for use on a window with a curved edge.
Figure 17:
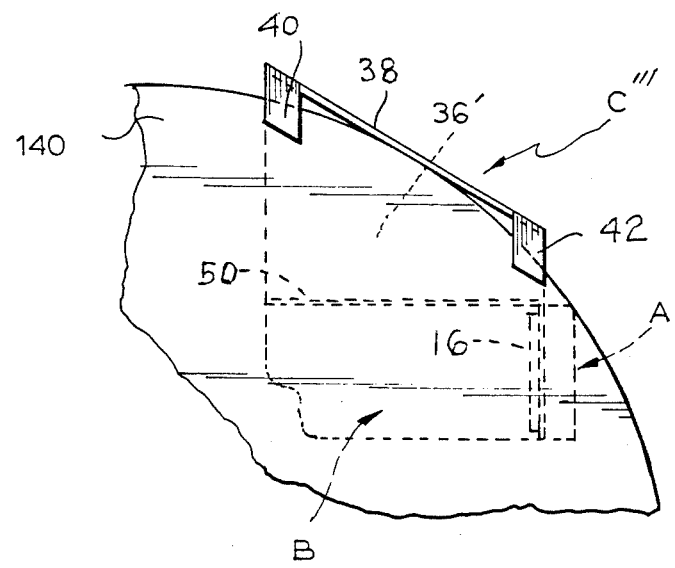
FIG. 17 illustrates the hanger shown in FIG. 16 mounted on a window.

FIGS. 16 and 17 illustrate another embodiment of the hanger shown in FIG. 7, denoted as C''''. Hanger C'''' is designed for use with vehicle side windows 140 with a curved top edge, as shown in FIG. 17.

Hanger C'''' is similar to hanger C', in that walls 38, 50, tabs 40, 42, opening 52, and slot 54 are the same. It is attached to the hood in the identical manner. However, wall 36', instead of being rectangular, has a somewhat different shape, with side 142 being longer than side 144 so as to compensate for the window curvature. As seen in FIG. 17, the shape of wall 36' compensates for the curvature of the top edge of window 140. Accordingly, the hood attached to wall 50 will be mounted substantially horizontally such that mirror 16 will be substantially vertical and provide the desired field of view for the driver.

It should now be understood that the present invention relates to a protected rearview mirror assembly for use on a vehicle in order to protect a rearview mirror and adjacent window section from rain and snow. The assembly comprises a mirror mounting member from which a protective hood extends in a rearward direction. The hood is provided with a member for hanging same to the top edge of a side window, or for adjustably mounting same to the door of the vehicle. The hood member may have a semicircular cross-sectional configuration or a generally rectangular cross-section configuration, and may be mounted to the side window or door of the vehicle in a position-adjustable manner.

While only a limited number of preferred embodiments have been disclosed herein for purposes of illustration, it is obvious that many variations and modifications could be made thereto. It is intended to cover all of these variations and modifications which fall within the scope of the present invention, as defined by the following claims.

I claim:

1. A rearview mirror assembly for use on a vehicle or the like of the type having a side window with a top edge wherein said assembly is mounted on the outer surface of said window, the assembly comprising a mirror, mirror mounting means, hood means having a top edge and hanger means disposed proximate to the top edge of said hood means for hanging said hood means from the top edge of the window, said hood means being mounted to and extending from said mirror mounting means toward the rear of the vehicle for a distance at least equal to the vertical dimension of said mirror, said hanger means defining a recess into which the top edge of the window is adapted to be received, whereby the mirror and the window adjacent to the mirror assembly are protected.

2. The assembly of claim 1, wherein said mirror mounting means comprises first and second parts, said first part having a substantially semicircular section, said second part being substantially planar, said second part being mounted to said first part at an obtuse angle with respect thereto, and a bracket for mounting said mirror to said first part.

3. The assembly of claim 1, wherein said hood means has a substantially semicircular cross-sectional shape.

4. The assembly of claim 1, wherein said hood means has a top edge and a bottom edge and wherein said top edge is longer than said bottom edge.

5. The assembly of claim 1, wherein said hanger means comprises a first substantially upstanding wall, a second substantially upstanding wall connected to said first wall and spaced from said first wall by a distance at least as great as the thickness of the window, and means horizontally projecting from said first wall for mounting said first wall to said hood means.

6. The assembly of claim 5, wherein said horizontally projecting means for mounting said first wall to said hood means comprises means for position-adjustably mounting said first wall to said hood means.

7. The assembly of claim 6, wherein said horizontally projecting position-adjustable mounting means comprises means for pivotally mounting said first wall to said hood means and means for locking said first wall in a given position relative to said hood means.

8. The assembly of claim 1, wherein said hood means has a top edge and wherein said hanger means comprises a wall extending downwardly from said hood means top edge.

9. The assembly of claim 1, wherein said hood means has a substantially rectangular cross-sectional shape.

10. The assembly of claim 9, further comprising means for positioning said hood means relative to said window.

11. The assembly of claim 10, wherein said hood means positioning means comprises a bracket having first and second generally planar walls, one of said walls being positioned-adjustably mounted to said mirror mounting means.

12. The assembly of claim 5, wherein the top edge of the side window is curved and wherein said first upstanding wall has first and second sides, said first side being longer than said second side to compensate for the curvature of the window top edge.

13. A rearview mirror assembly for use on a vehicle of the type having a side window with a top edge, wherein said assembly is mounted on the outer surface of said window, said assembly consisting essentially of a mirror, mirror mounting means, hood means having a top edge and hanger means disposed proximate to the top edge of said hood means for hanging said hood means from the top edge of the window, said hood means being attached to and extending from said mirror mounting means toward the rear of the vehicle for a distance at least equal to the vertical dimensions of said mirror, said hanger means consisting essentially of a first substantially upstanding wall, a second substantially upstanding wall connected to said first wall and spaced from said first wall by a distance at least as great as the thickness of the window and defining a recess into which the top edge of the window is adapted to be received, and means for mounting said fist wall to said hood means, whereby the mirror and the window adjacent to the mirror assembly are protected.

* * * * *